Oct. 24, 1961 F. DANIELS 3,005,764
NEUTRONIC REACTOR STRUCTURE
Filed May 24, 1948 4 Sheets-Sheet 3

INVENTOR.
Farrington Daniels
BY
Roland A. Anderson
Attorney

Oct. 24, 1961 F. DANIELS 3,005,764
NEUTRONIC REACTOR STRUCTURE
Filed May 24, 1948 4 Sheets-Sheet 4

Inventor:
Farrington Daniels
By: Roland A. Anderson
Attorney.

United States Patent Office 3,005,764
Patented Oct. 24, 1961

3,005,764
NEUTRONIC REACTOR STRUCTURE
Farrington Daniels, Madison, Wis., assignor to the United States of America as represented by the United States Atomic Energy Commission
Filed May 24, 1948, Ser. No. 28,764
2 Claims. (Cl. 204—193.2)

This invention is concerned with a novel construction for neutronic reactors. More particularly the invention deals with a neutronic reactor structure which may be operated at very high temperatures to maximize the efficiency of utilization of power generated in the reactor.

In a neutronic reactor, energy is liberated in a chain reaction of nuclear fissions, each fission being induced by the impingement of a neutron on the nucleus of a fissionable atom. In such nuclear fission there is released a susbtantial amount of energy in the form of heat. In addition there are liberated additional neutrons which produce further fissions in other atoms, the reaction thus being a self-sustaining chain when the reproduction factor is equal to unity.

The best-known type of neutronic reactor is the "thermal" reactor, wherein the neutrons liberated in fission, which originally have extremely high energies, are slowed ("moderated") to thermal energy, i.e. the energy which they possess because of the temperature of the surrounding medium. The slowing process is accomplished by successive collisions of the neutrons with nuclei of the moderator. The moderator is a material of light atomic weight, in order that the energy transfer in each collision may be maximized. This is required in order that the number of collisions necessary to reduce the energy of the neutron to thermal energy be minimized, since in every collision of the neutron with an atom, there is a finite probability that the collision will result in capture of the neutron by the nucleus of the atom as well as the probability of elastic collision which is desired. Such probabilities in the case of any given material are described in terms of its "cross sections" for capture and elastic collision, respectively. The choice of moderator is governed therefore by atomic weight and nuclear cross sections, in addition to other factors such as ease of handling, structural strength, and availability.

In utilizing a neutronic chain reaction for the production of power it is desirable that the maximum temperature be obtained in order that the energy liberated in the reaction be utilized with the greatest possible efficiency. The operation of a reactor at extremely high temperatures introduces additional limitations upon the selection of the moderator material and upon the form in which the fissionable material is employed. The moderator must of course be capable of withstanding the high temperatures desired without deleterious effects. Among the moderators which have been found to be particularly well suited for high temperature operation, having change-of-state temperatures above 1500° C., are beryllium oxide and graphite. One of the materials most commonly used as the thermally fissionable material or fuel in a neutronic reactor is uranium, of which the isotope $U^{235}$ is thermally fissionable (fissionable by thermal neutrons). The fissionable material should also be in a form having a change-of-state temperature above 1500° C. By far the most satisfactory form in which the uranium may be incorporated in a reactor for operation at high temperatures is as an oxide of uranium, preferably uranium dioxide, which has a melting point of greater than 2200° C. and a vapor pressure of $7 \times 10^{-5}$ mm. Hg at 1870° C. However the structural strength of uranium dioxide, particularly at elevated temperatures, has before this invention constituted a limitation upon the temperature of operation.

The problem of structural weakness of the fuel material at high temperatures has been aggravated in the high-temperature reactors of the prior art by the fact that since the fissions are generated in the fissionable material, that material reaches much higher temperatures than does the moderator. This difficulty is made even more pronounced by the fact that oxides of fissionable material, such as uranium oxide, have relatively low heat conductivity, so that the temperature gradient within the fuel elements of the high temperature reactors heretofore contemplated made it impossible to achieve in the moderator the high temperatures of which refractory moderators are capable.

By the neutronic reactor structure of the present inventon there is provided the ability to more fully utilize the energy generated in nuclear fission for the production of useful power. The present invention provides neutronic reactors capable of operation at temperatures heretofore impractical.

Generally, the structure of the reactors of the invention is distinguished from the reactors heretofore contemplated in that the high-melting-point compound of the thermally fissionable material is dispersed and held in a cohesive matrix or binder of the moderator material. In this manner the moderator material constitutes a type of physical support for the particles of fissionable material which makes the inferiority of the physical strength of the fissionable material at high temperatures relatively unimportant. Likewise advantage is taken of the superior heat conductivity of the moderator to prevent the presence of excessive temperatures in the fissionable material without lowering the power output of the reactor. The difficulties which may be encountered as a result of change of physical or chemical state at extremely high temperatures by the fissionable material are minimized. In this manner the present invention raises the temperature limits for neutronic reactors to a point much closer to the capabilities of the moderator material and minimizes the limitations imposed by the physical and chemical properties of the refractory forms of the fissionable material, which, although they are superior at high temperatures to the fissionable materials in the metallic state, are nevertheless inferior to the properties of such moderator materials as beryllium oxide and graphite.

Embodiments of the teachings of the invention are illustrated in the drawing in which.

Figure 1:
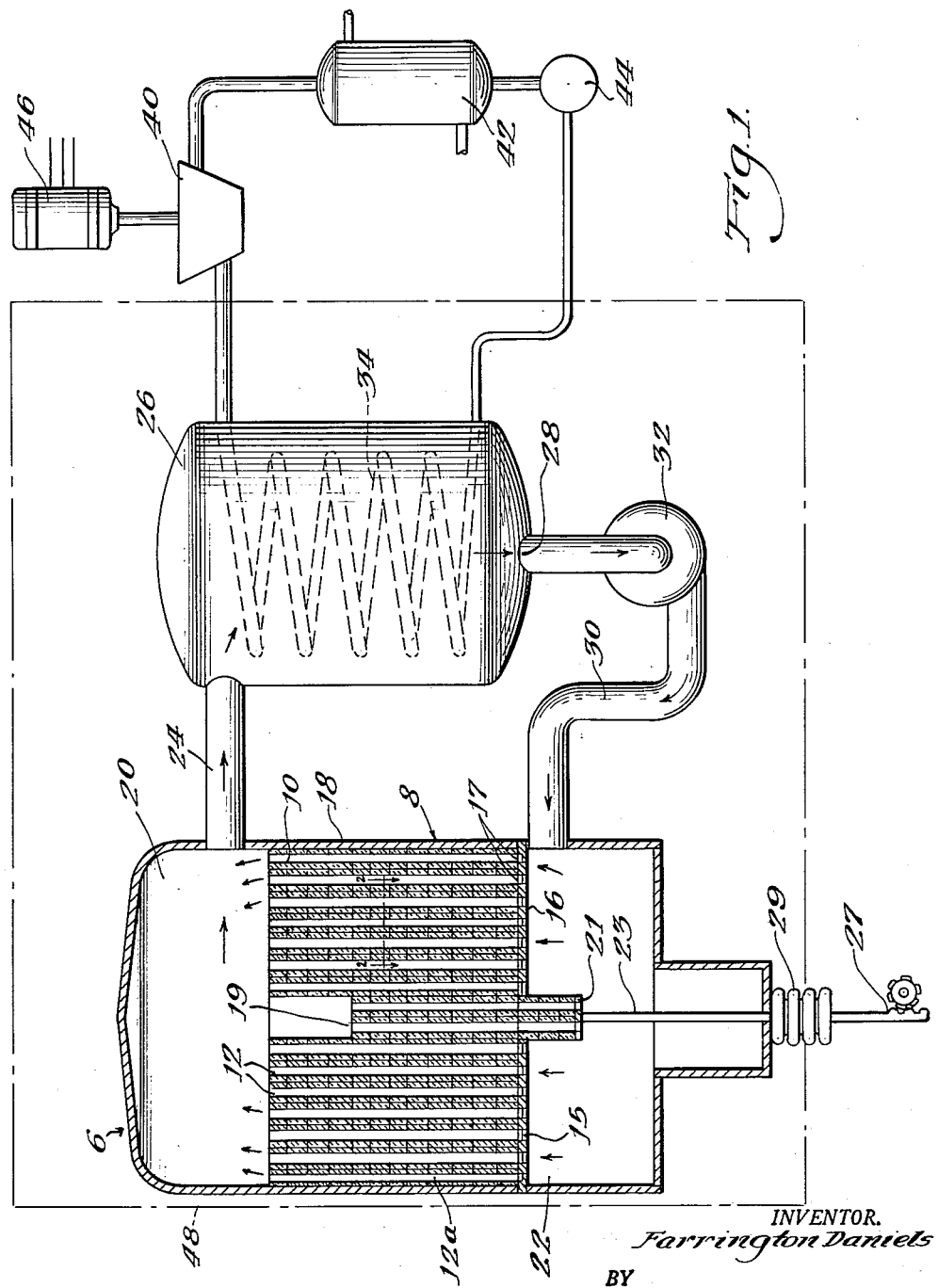
FIG. 1 is a schematic diagram of an atomic power plant.
Figure 2:
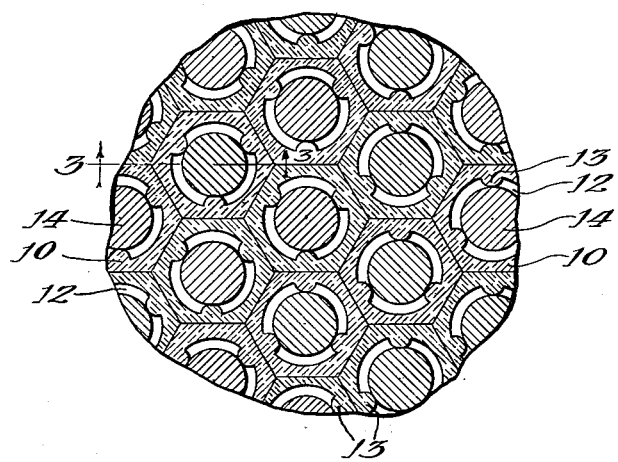
FIG. 2 is a fragmentary horizontal cross section of a portion of the structure illustrated schematically in FIG. 1 along the line 2—2 of FIG. 1.
Figure 3:
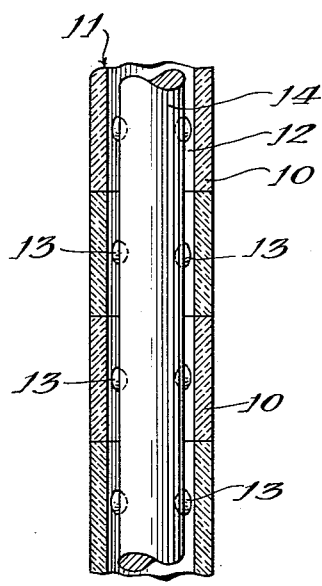
FIG. 3 is a vertical cross sectional view partly in elevation of one of the assemblies illustrated in FIG. 2 along the line 3—3 of FIG. 2.

Referring to FIG. 1, a neutronic chain reactor is generally designated by the numeral 6 and the active portion or reactive composition thereof by the numeral 8. The reactive composition is formed in the following manner:

Hexagonal blocks 10 of beryllium oxide, as illustrated in FIGS. 2 and 3, are piled on top of each other to form a plurality of rectilinear hexagonal stacks 11. Thorugh each block 10 is an axial cylindrical aperture 12; the aperture 12 thus forms a continuous cylindrical aperture through the stack 11. Through this aperture 12 extends a cylindrical rod 14. The rods 14 are composed of sintered beryllium oxide and uranium dioxide, the latter being uniformly distributed throughout the former. The active portion 8 is built of a large number of these hexagonal stacks 11 placed contiguous to each other so as to form a vertical cylinder of beryllium oxide, the vertical aperture 12 being equally spaced therein and the rods 14 partially filling said apertures. The diameter of the rods 14 is less than the diameter of the apertures 12 so that there exists through each of said apertures 12 an annulus surrounding the rods 14, the annulus being adapted to permit the flow of a coolant through the apertures 12 and past the rods 14. The rods 14 are maintained centrally of the apertures 12 by lugs 13 projecting from the walls of the apertures 12.

Referring again to FIGURE 1, the active portion 8 rests on a thick metal plate 16 preferably of steel having a high melting point. The metal plate 16 has apertures 17 therethrough corresponding in position to the apertures 12 in the individual stacks 11. Across each of the apertures 17 in the steel plate 16 is a horizontal rod 15 suitable to support the weight of the rods 14 but to allow the flow of gas into the apertures 12. The active portion 8 is surrounded at its periphery by a pressure tight shell 18, also preferably of steel. The central portion 19, of the active portion 8, is supported on a platform 21, which platform 21 constitutes the central portion of plate 16, but is separate therefrom and adapted to be moved vertically by means of support rod 23, which is driven by a rack-and-pinion 27, through a gas-tight bellows 29, thus effectively changing the size of the active portion 8 to control the chain reaction.

Above the active portion 8 within the shell 18 is an outlet header 20. Below the active portion 8 and the plate 16 within the shell 18 is an inlet header 22. Extending from the outlet header 20 through the shell 18 is a conduit 24, preferably of a refractory material. The conduit 24 leads to an evaporator or heat exchanger 26. The heat exchanger 26 likewise has an outlet 28 which is in turn attached to one end of the conduit system 30, the other end of which terminates in inlet header 22. In the conduit system 30 is a blower 32 adapted to circulate a gas.

The system as described above, comprising inlet header 22, apertures 12, outlet header 20, conduit 24, heat exchanger 26, and conduit system 30, is filled with a gas such as helium. The gas is circulated through the system by the blower 32. The gas in the inlet header 22 at a temperature of, for example, 500° F. and a pressure of, for example, one to three atmospheres is forced upward through the apertures 12 in the stacks 11 into the outlet header 20. During its transit through the apertures 12 the gas is heated by the heat energy released in the active portion 8 by the chain reaction to a temperature of, for example, 1400° F. to 1800° F. with a pressure drop through the apertures 12 of, for example, 0.15 atmosphere. The heat energy imparted to the gas by the active portion 8 is transmitted to the secondary system of the heat exchanger 26 to be described below.

In the heat exchanger 26 is a secondary portion 34 connected in series with a turbine 40, a condenser 42 and a pump 44. The secondary system thus described contains water in the manner usual to such systems, the water being boiled in the secondary portion 34 of the heat exchanger 26, the resultant steam driving the turbine 40 and then being condensed in the condenser 42. The turbine 40 is mechanically coupled to a generator 46.

The neutronic reactor 6 liberates, for example, 228,000 B.t.u. per minute of heat energy, which is equivalent to 4,000 kw. of heat energy, and the generator produces, for example 1,000 kw. of electrical energy, the system thus having an efficiency of 25 percent. If desired, up to 40,000 kw. of heat energy may be liberated. The chain reacting system is shielded from the exterior in the usual manner by a shield 48 comprising, for example, a thick wall of concrete.

The active portion or reactive composition 8 of the reactor 6 may be, for example, 6 to 8 feet in diameter and 6 to 8 feet high. The blocks 10 of which the stacks 11 are constructed may be 3 inches across flats and have an inner diameter of two inches. The diameter of the rods 14 may be 1½ inches thus leaving a ¼ inch annulus for the flow of the gaseous coolant. In one preferred embodiment of the invention the vertical apertures 12a which are around the outer perimeter of the active portion 8, as indicated in FIGURE 1, are at least partially filled with rods of a material adapted to be converted to a fissionable material upon exposure to neutron flux; for example these rods may consist of sintered beryllium oxide and thorium dioxide. It is desirable that the beryllium oxide moderator material both in the blocks 10 and the rods 14 be of the highest possible density. The effect of varying the density of the beryllium oxide may be seen in the following table of critical dimensions for the cylindrical active portion or reactive composition 8 containing uranium dioxide in which the uranium has been "enriched" in $U^{235}$ so that the $U^{235}$ constitutes 20 percent instead of the 0.71 percent found in natural uranium:

| Density of BeO (gm./cc.) | Ht. of cylinder (ft.) | Diam. of cylinder (ft.) | BeO (kg.) | Be in BeO (kg.) | $U^{235} O_2$ (kg.) | $U^{235}$ in $U^{235} O_2$ (kg.) |
|---|---|---|---|---|---|---|
| 2.7 | 5.2 | 5.6 | 7,160 | 2,580 | 13.8 | 12.2 |
| 2.2 | 6.3 | 6.8 | 11,500 | 4,150 | 20.8 | 18.4 |

It will be understood that the exact amounts, spacing, and purity of the fissionable and moderator materials and the critical size of the reactive composition constitute no portion of the present invention, being readily computable by persons skilled in the art from well-known design criteria for neutronic reactors, as exemplified by the design criteria set forth in the copending application of Fermi and Szilard, filed December 19, 1944, Serial No. 568,904, now Patent 2,708,656, dated May 17, 1955, among others. Accordingly the dimensions given above will be understood to be mere examples. Likewise it will be understood that the structure above described may be modified for use with other moderators, such as graphite, or with other high-melting-point chemical forms of fissionable materials, such as uranium carbide or oxides of plutonium. As disclosed in the copending application last cited, and as now well known, every mode or manner of disposition of fissionable material in moderator material, whether the fissionable material be aggregated to form a heterogeneous "geometry" or dispersed to form a homogeneous "geometry," has a measurable characteristic called its "$k$ factor," which is a numerical representation of the neutron reproduction ratio which would be obtained in an infinite structure consisting of identical units, repeated in all directions, each unit being constructed in accordance with the particular mode or manner of disposition of the fissionable material in the moderator, including such diverse characteristics as the chemical and physical form of the fissionable material and the moderator, the unavoidable or deliberate presence of impurities, and the nature and presence of a coolant, and of structural materials which must necessarily be employed. If the $k$ factor exceeds unity, a self-sustaining reaction will be obtained in a finite structure consisting of such repetitive units, the size at which an overall neutron reproduction of unity is obtained being designated "critical size." Both the $k$ factor and the critical size of the reactors herein described, or any others made in accordance with the invention, will readily be determined by persons skilled in the art by methods of measurement now well known, as set forth, for example, in the copending application of Enrico Fermi, Serial No. 534,129, filed May 4, 1944, now Patent 2,780,-595, dated Feb. 5, 1957.

Figure 4:
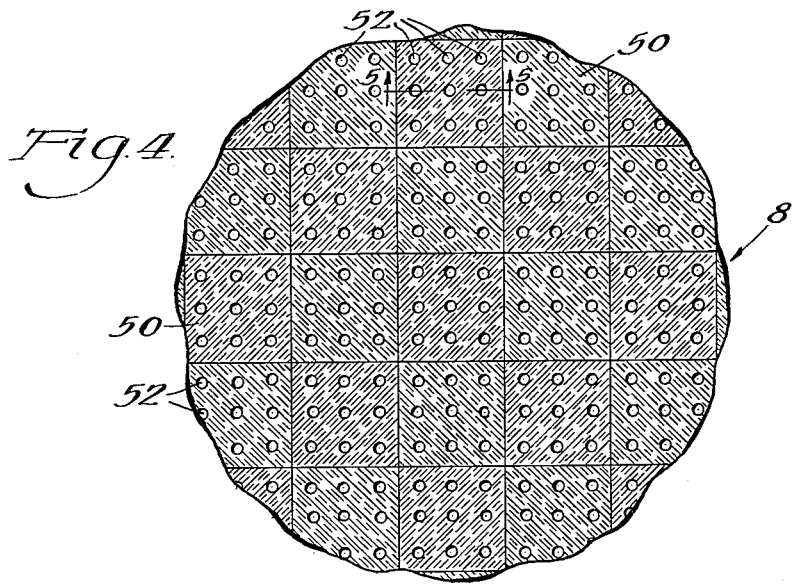
FIG. 4 is a horizontal cross sectional view of an alternate form of construction corresponding to the view of FIG. 2.
Figure 5:
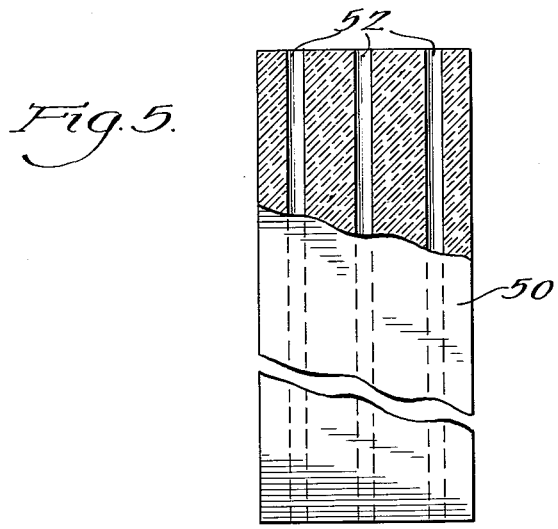
FIG. 5 is a vertical sectional view, partly in elevation of one of the elements of FIG. 4.

In FIGURES 4 and 5 is illustrated an alternative construction for the reactive composition 8 of FIGURE 1. In this embodiment the reactive composition is composed of long blocks of graphite of square or other suitable cross section impregnated throughout with an oxide of uranium. Vertical apertures 52 extend through the blocks 50 to provide passage for and heat exchange with the coolant.

The graphite may be impregnated with uranium oxide by first impregnating with uranyl nitrate up to 4 or 5 percent by soaking in an ether solution of uranyl nitrate and evaporating the ether. By heating the graphite to about 800° C., the uranyl nitrate is then converted to $U_3O_8$ which remains deposited in the graphite. Preferably, the graphite is heated to about 1300° C. to convert the uranyl nitrate to $UO_2$. At still higher temperatures, uranium carbide, which is likewise a desirable form of fissionable material, may be formed. The uranium oxide is deposited uniformly through the graphite. By a similar process, beryllium oxide may likewise be so impregnated.

Although the exact dimensions and detailed specifications of the reactor constitute no part of this invention exemplary details may be given. The reactive composition so constructed may be 6 feet in diameter and 5½ feet high. The apertures may be ⅝ inch in diameter with 81 equally spaced apertures per square foot, or approximately 18 percent of the total volume. The coolant may be helium at 10 atmospheres circulated at a rate of 30,000 cubic feet per minute. The inlet temperature may be 500° F. and the outlet temperature of the coolant 1400° F. The $U_3O_8$ may be from 0.6 to 1.5 percent by weight of the graphite and the total weight of $U^{235}$ in the structure may be 15 to 30 kilograms with a total weight of graphite of 5350 kilograms. The power output of the reactor may be 40,000 kilowatts of heat.

An impregnated reactor offers great advantage from the point of view of minimizing hold-up of materials in processing. A reactor must occasionally be shut down to replace the fissionable material, since the fissionable material is consumed in fission during operation of the reactor. The replacement must of course be made after a relatively small portion of the fissionable material has been so consumed. In enriched materials, the fissionable material is so expensive that it is required that it be reused after separation therefrom of fission products. This separation may be accomplished while the reactor is operating with another batch of fissionable material. Thus in determining the total amount of fissionable material required for continuous operation of any type of reactor it is necessary to consider not only the amount of fissionable material required to sustain the chain reaction in the form of reactor adopted, but also to provide sufficient surplus so that the reactor may be operated continuously. The amount of surplus required for this purpose is directly effected by the time required for reprocessing fissionable material which has been removed from the reactor so that it may later again be used in the reactor.

From this point of view, impregnation of the solid moderator with the fissionable material offers great advantage. Where impregnation is employed, the time of processing for recovering the fissionable material for reuse may be substantially reduced. Where other means for binding the fissionable material into the moderator matrix are employed, it is commonly necessary to subject the entire moderator member to processing in order to recover the fissionable material in pure form. Thus the chemical separation process must not only separate the fissionable material from the fission products, but also from the moderator. Since the fissionable material constitutes but a small portion of the entire mass, the chemical separation necessary to recover it in pure form is thus complex and correspondingly long. However where impregnation is employed, the fissionable material and fission products may be simply removed from the moderator, thus providing only a small mass of material from which the pure fissionable material may be extracted for reuse in a relatively short time. Similarly, the peripheral bodies of moderator may be impregnated with a compound of a fertile material such as thorium.

In the case of graphite and uranium oxide, the fissionable material may be leached from the block by the action of nitric acid. Preferably the graphite is first burned and the fissionable material leached from the ashes; in this manner volatile fission products will be taken off with the volatile products of the burning of the graphite. Further purification of the fissionable material before re-impregnation thereof in another moderator block is accomplished by methods now well known in the neutronic reactor art.

Figure 6:
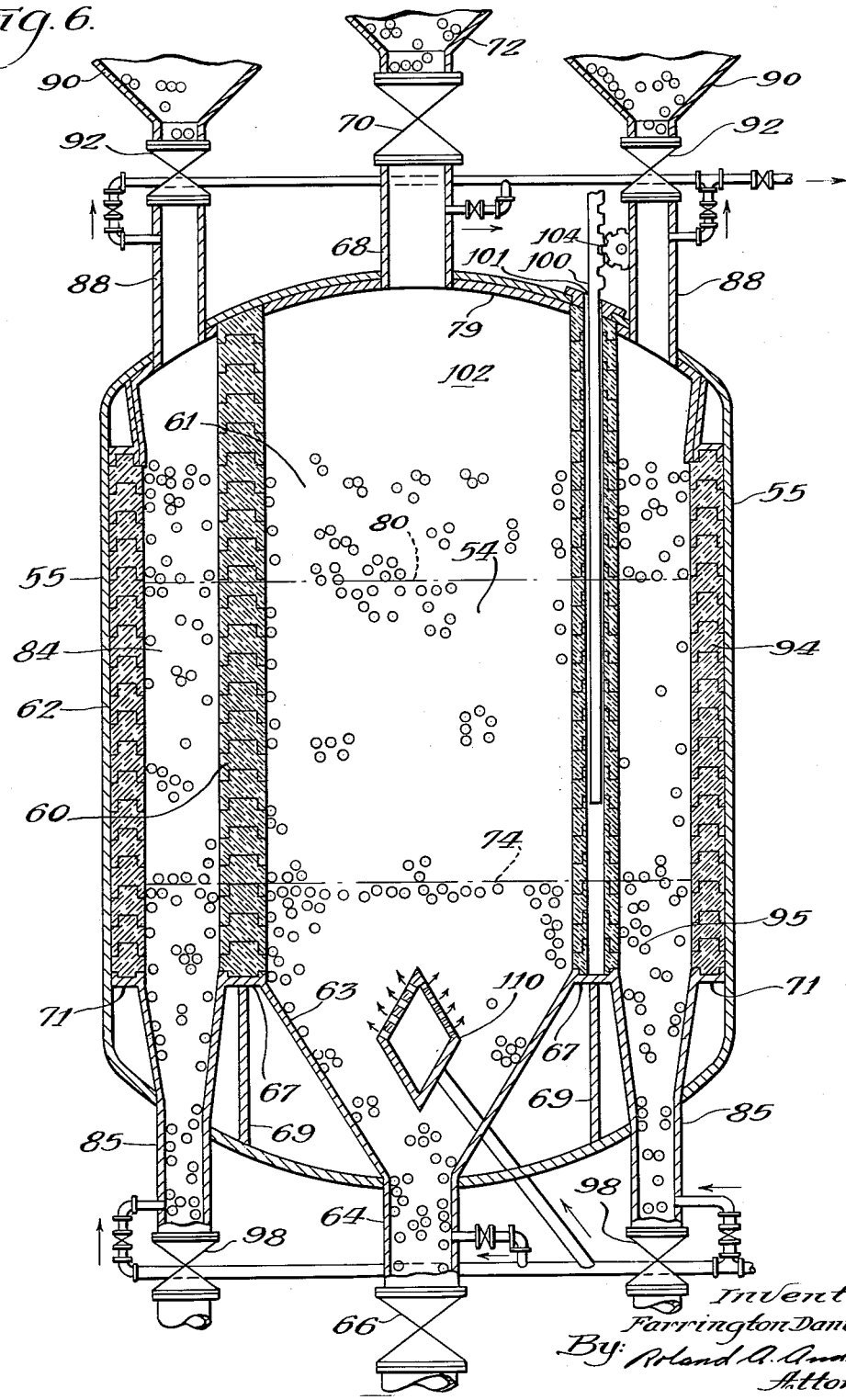
FIG. 6 is a partially diagrammatic central vertical sectional view of a neutronic reactor constituting another embodiment of the invention.

In FIGURE 6 is illustrated still another embodiment of the invention which may be incorporated in the system of FIGURE 1. The reactor here illustrated in a "pebble" reactor. The reactive composition or active portion 54 is enclosed within a cylindrical tank 55. Within the tank 55 are spaced inner and outer reflector walls 60 and 62 respectively of beryllium oxide blocks. The inner reflector wall 60 defines a cylindrical space 61, the space 61 terminating at the bottom in a funnel-like bottom wall 63 connected to an outlet pipe 64 equipped with a valve diagrammatically indicated at 66. The wall 60 is supported by a annular flange at the top of the wall 63 forming a ledge or shelf 67 supporting wall 60, the shelf 67 being re-enforced by an annular vertical web 69. The outer reflector wall 62 is supported by an annular ledge or shelf 71 projecting from the inner surface of the tank 55. The space 61 within the inner reflector wall 60 is charged through an inlet pipe 68 equipped with a conventional valve indicated at 70, connected to a funnel-like tank or reservoir 72. The space 61 is first charged with beryllium oxide lumps or pebbles to the level indicated by the dotted line 74 and then with a group or pile of pebbles or lumps formed of co-precipitated oxide of beryllium and of a fissionable isotope to provide the reactive composition 54. The reactive composition 54 extends to the level indicated at 80 and is then covered with another group of beryllium oxide lumps or pellets.

An annular space 84 between the reflector walls 60 and 62 is charged through a plurality of inlet pipes 88 communicating with funnel-like tanks or receptacles 90 through valves diagrammatically indicated at 92. The space 84 may be wholly or partially filled with lumps or pebbles of thorium oxide, for conversion of $Th^{232}$ to $U^{233}$ by the neutron absorption and beta decay chain now well known in the art. The bottom of the space 84 communicates with pipes or funnels 85 which are equipped with conventional valves 98.

The neutron density within the system is controlled by one or more control rods 100, which reciprocate in a well 101 in the wall 60. The coolant gas such as helium enters the system through a perforated inlet tank 110 near the bottom of the space 61 and flows out at the top.

As stated above the lumps or pebbles of the reactive composition 54 are preferably formed of co-precipitated oxides of beryllium and a fissionable isotope such as $U^{233}$ or $U^{235}$, or natural uranium enriched in such isotopes or plutonium. The pebbles or lumps are produced by precipitating the mixed oxides from a solution containing both beryllium and uranium (or other fissionable material) salts. The resulting precipitate containing the fissionable isotope or isotopes is intimately mingled in a cohesive matrix of the beryllium oxide. The following table indicates operative sizes of reactors constructed of oxides of beryllium and fissionable isotopes of uranium in the manner described, with approximately spherical pellets, so that there are approximately 30 percent voids.

| Percent by weight | | Neutron loss to BeO, percent | Weight UO₂ with 30% voids, kg. |
|---|---|---|---|
| BeO | UO₂ | | |
| 98 | 2 | 1.6 | 72 |
| 99 | 1 | 3.2 | 44 |
| 99.5 | 0.5 | 6.2 | 29 |
| 99.75 | 0.25 | 11.7 | 22 |

The figures indicated in the table are based on the assumption that the uranium is pure $U^{235}$. However, the figures are valid if the concentration of $U^{235}$ in the uranium oxide is such that the amount of $U^{235}$ is equal to that indicated, provided that the amount of $U^{238}$ does not substantially exceed the amount of $U^{235}$ present.

It is of course understood that the specific examples set forth herein are for the purpose of disclosing the invention in accordance with the Patent Laws and that many modifications may be made in the specifically illustrated embodiments without departing from the intended scope and spirit of the invention. It will be obvious that the teachings of the invention may be employed in a large variety of reactors, including, for example, reactors in which the thermally fissionable material is plutonium or its compounds.

Some of the features set forth above, but not claimed in the claims hereto annexed, are disclosed and claimed in the co-pending applications of the same inventor filed in the United States Patent Office on October 8, 1946, Serial No. 701,909, now Patent No. 2,975,116, dated March 14, 1961, and on October 11, 1945, Serial No. 621,845, now Patent 2,809,931, dated October 15, 1957.

What is claimed is:

1. A neutronic reactor active portion comprising a plurality of vertically disposed, contiguous, rectilinear stacks or hexagonal blocks of beryllium oxide of equal size, said stacks having continuous, axial, cylindrical apertures of equal diameter extending therethrough, and axial cylindrical rods consisting of a uniform sintered mixture of uranium dioxide and beryllium oxide of lesser diameter than said apertures centered in said apertures.

2. An active portion according to claim 1 which is 6 to 8 feet in diameter and 6 to 8 feet high, in which the beryllium oxide blocks are 3 inches across flats and have an inner diameter of 2 inches, and in which the rods are 1½ inches in diameter.

References Cited in the file of this patent

UNITED STATES PATENTS

| 420,881 | Langhans | Feb. 4, 1890 |
| 616,276 | Thowless | Dec. 20, 1898 |
| 626,460 | Edison | June 6, 1899 |
| 656,652 | Markey | Aug. 28, 1900 |
| 1,306,568 | Weintraub | June 10, 1919 |
| 2,526,805 | Carter | Oct. 24, 1950 |
| 2,708,656 | Fermi et al. | May 17, 1955 |
| 2,782,158 | Wheeler | Feb. 19, 1957 |

FOREIGN PATENTS

| 16,534 | Great Britain | 1896 |
| 10,815 | Great Britain | 1899 |
| 26,855 | Great Britain | 1905 |
| 5,416 | Great Britain | 1908 |
| 114,150 | Australia | May 2, 1940 |
| 114,151 | Australia | May 3, 1940 |
| 861,390 | France | Feb. 7, 1941 |
| 233,011 | Switzerland | Oct. 2, 1944 |

OTHER REFERENCES

Goodman: "The Science and Engineering of Nuclear Power," pp. 298, 299, 300, 301, 302, 303, 304, 305 and 374 to 377. Addison-Wesley Press, Inc. (1947).

Roberts et al.: "Uranium and Atomic Power," J. Applied Physics, vol. 10, pp 612–614 (1939).

Handbook of Physics, and Chemistry, 26th edition, 1942–43, pp. 478–479, Chem. Rubber Pub. Co.

Kelly et al.: Phy. Rev. 73, 1135–9 (1948).

Smith: "Atomic Energy for Military Purposes," page 75, August 1945.